Figure 4:
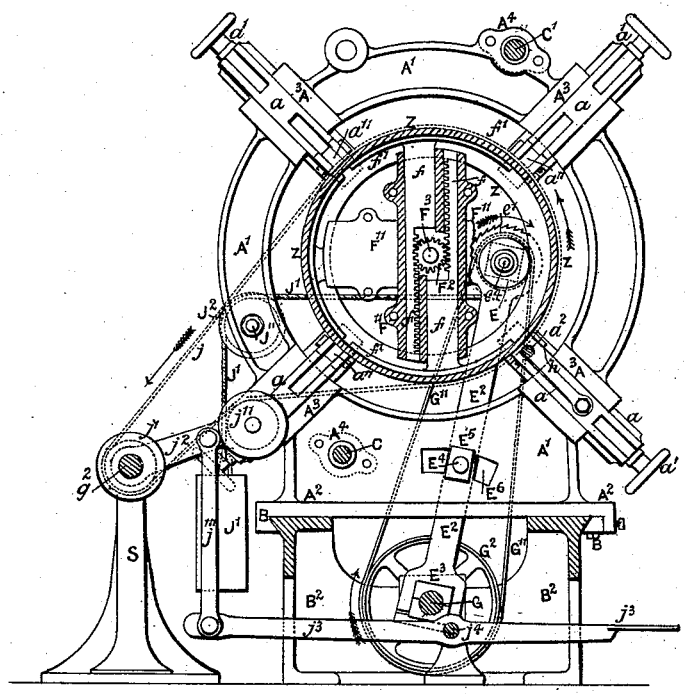

(No Model.) 5 Sheets—Sheet 1.
S. WRIGHT.
MECHANISM USED IN THE MANUFACTURE OF BARRELS.
No. 471,838. Patented Mar. 29, 1892.
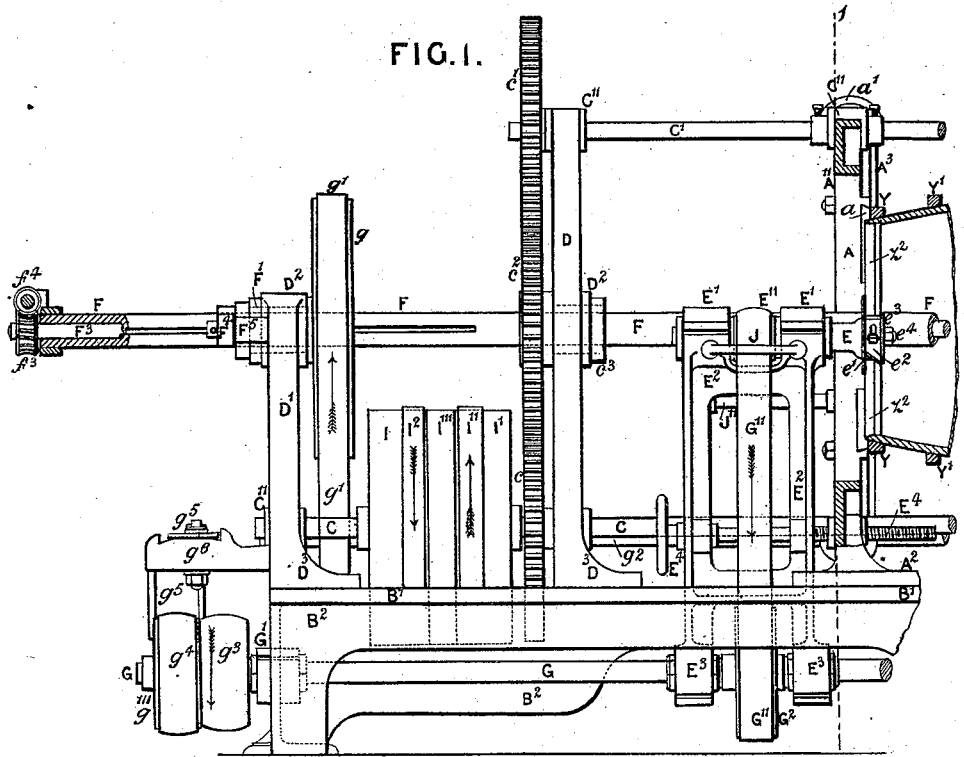

(No Model.) 5 Sheets—Sheet 2.
S. WRIGHT.
MECHANISM USED IN THE MANUFACTURE OF BARRELS.
No. 471,838. Patented Mar. 29, 1892.
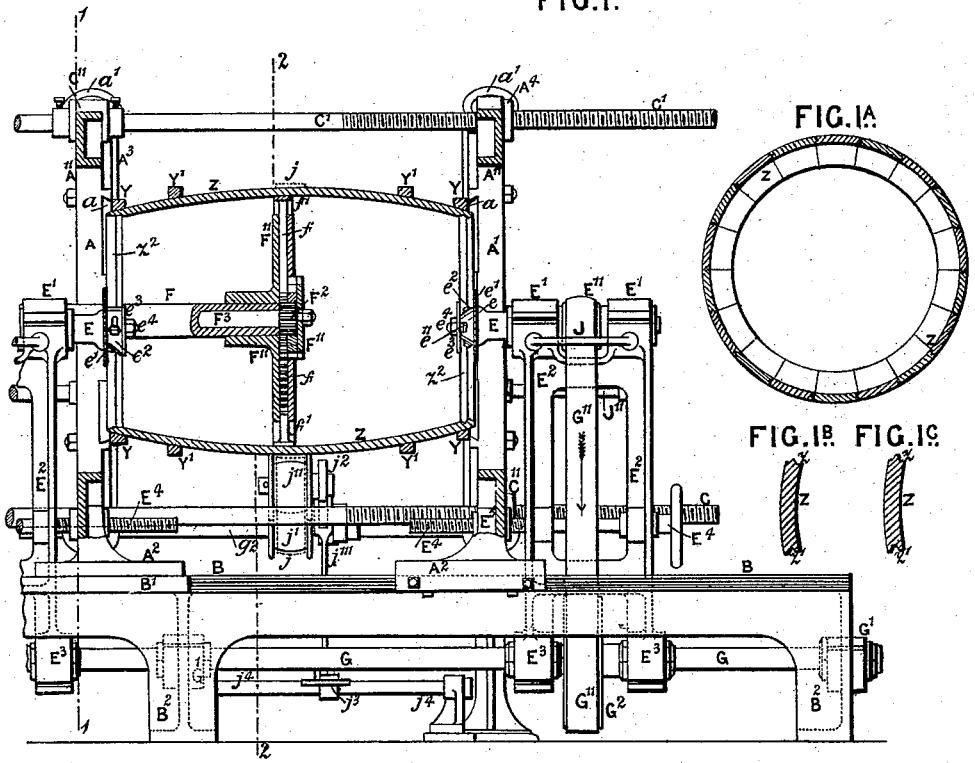
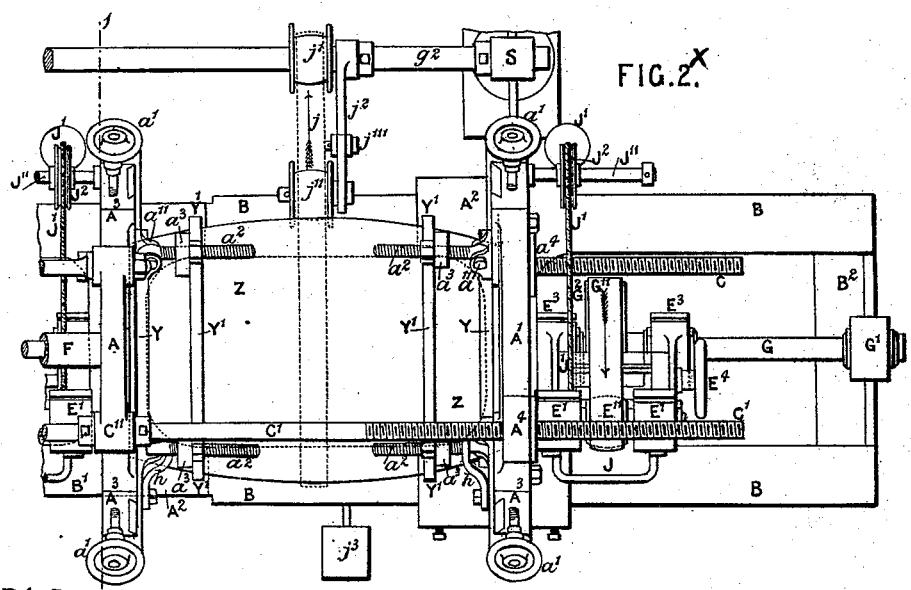
Witnesses:
George Baumann
John Revell
Inventor
Samuel Wright
By his Attorneys
Howson and Howson (No Model.) 5 Sheets—Sheet 3.
S. WRIGHT.
MECHANISM USED IN THE MANUFACTURE OF BARRELS.
No. 471,838. Patented Mar. 29, 1892.
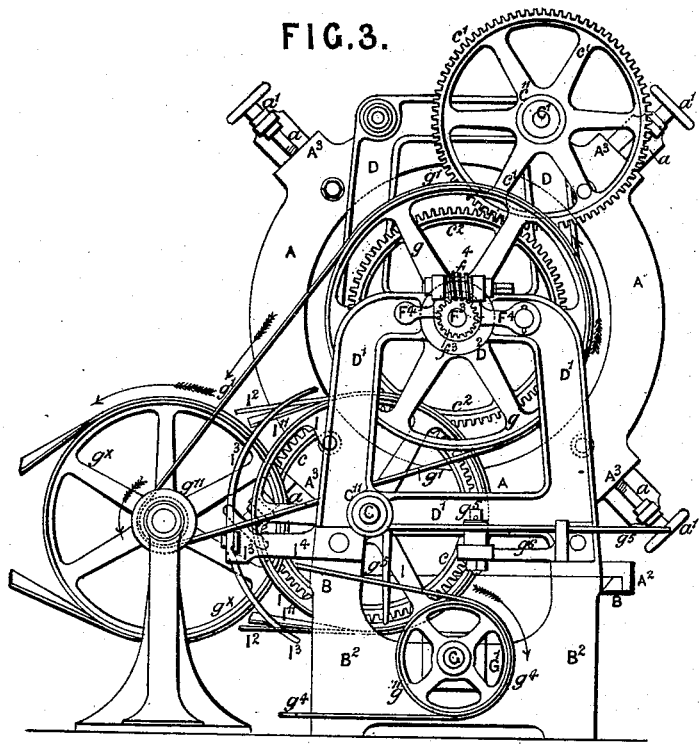

(No Model.) 5 Sheets—Sheet 4.

S. WRIGHT.
MECHANISM USED IN THE MANUFACTURE OF BARRELS.

No. 471,838. Patented Mar. 29, 1892.

Witnesses:
George Baumann
John Revell

Inventor
Samuel Wright
By his Attorneys
Howson and Howson (No Model.) 5 Sheets—Sheet 5.
S. WRIGHT.
MECHANISM USED IN THE MANUFACTURE OF BARRELS.
No. 471,838. Patented Mar. 29, 1892.
FIG. 12.
FIG. 13.
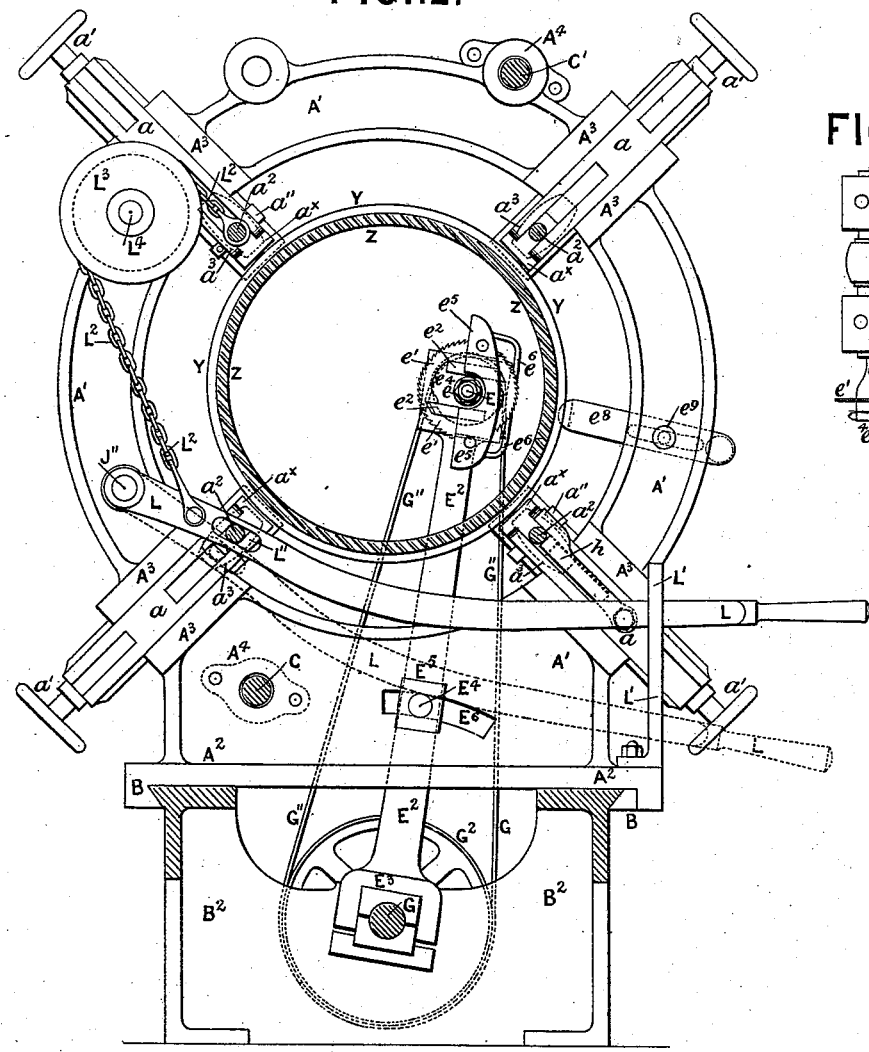
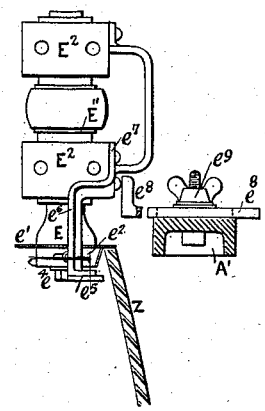
Witnesses:
George Baumann
John Revell
Inventor
Samuel Wright
By his Attorneys
Howson and Howson

UNITED STATES PATENT OFFICE.

SAMUEL WRIGHT, OF GLASGOW, SCOTLAND, ASSIGNOR TO HIMSELF, JAMES MUIR, AND WILLIAM BOYD, OF SAME PLACE.

MECHANISM USED IN THE MANUFACTURE OF BARRELS.

SPECIFICATION forming part of Letters Patent No. 471,838, dated March 29, 1892.

Application filed April 21, 1890. Serial No. 348,831. (No model.) Patented in England February 29, 1888, No. 3,091; in Germany March 11, 1888, No. 45,118; in Spain July 13, 1888, No. 8,242; in France August 27, 1888, No. 192,614; in Belgium August 27, 1888, No. 83,036; in Sweden December 15, 1888, No. 2,113; in Norway December 19, 1888, No. 1,158; in Italy December 21, 1888, XLVIII, 483, and in Austria-Hungary April 4, 1889, No. 52,065.

*To all whom it may concern:*

Be it known that I, SAMUEL WRIGHT, machinist, a subject of the Queen of Great Britain and Ireland, residing at 96 Buchanan Street, Glasgow, in the county of Lanark, Scotland, have invented Improved Mechanism Used in the Manufacture of Barrels and Packages, of which the following is a specification.

Patents have been obtained for said invention in Great Britain, No. 3,091, dated February 29, 1888; in France, No. 192,614, dated August 27, 1888; in Belgium, No. 83,036, dated August 27, 1888; in Spain, No. 8,772, dated December 19, 1888, patent of addition to No. 8,242, dated July 13, 1888; in Austria-Hungary, No. 52,065, dated April 14, 1889; in Germany, No. 46,680, dated May 4, 1888, patent of addition to No. 45,118, dated March 11, 1888; in Norway, No. 1,158, dated December 19, 1888; in Italy, Vol. XLVIII, 483, dated December 21, 1888, and in Sweden, No. 2,113, dated December 15, 1888.

My invention comprises a new or improved construction of machine or combinations of mechanism and saws or cutters, and knives and lances for trussing, chining, crozing, grooving, and finishing casks or barrels and box barrels or packages.

In order to enable others skilled in the art to which my invention relates to understand how it may be carried into effect or practice, I have hereunto appended five explanatory sheets of drawings, in which the same reference-letters are used to indicate corresponding parts in all the figures where shown.

Figure 9:
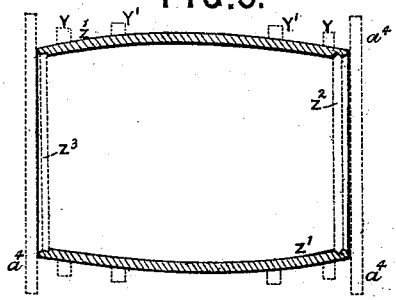
Figure 11:
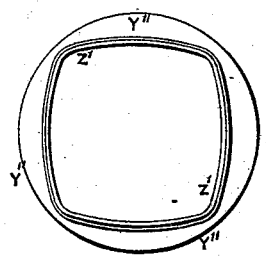

Figures 1, $1^\times$, 2, and $2^\times$ on Sheets 1 and 2 are a longitudinal elevation, partly in section, and a plan, respectively, of my new or improved construction of machine or combination of mechanism for trussing, crozing, grooving, and finishing casks or barrels and box barrels or packages, Fig. $1^\times$ being a continuation of Fig. 1 and Fig. $2^\times$ a continuation of Fig. 2, the lines 1 1 representing where respective figures should join. Fig. 3 on Sheet 3 is an end elevation looking at the left-hand or gearing end of the machine shown on Sheet 1; and Fig. 4 on Sheet 4 is a transverse section as taken on the line 2 2 of Fig. $1^\times$, Sheet 2, looking in the same direction. Figs. 5 and 6 on Sheet 3 are detached detail views, to an enlarged scale, of the slides and their dogs or grippers, which secure the barrel or package in the head-stocks A A′ while being rotated and operated on in the machine; and Figs. 7 and 8 are an end view and plan detached, to a large scale, of the cutters and saw for chining and crozing the ends of the cask or package to show the details of construction more clearly. Fig. $1^A$ on Sheet 2 shows a sectional end view taken on the line 2 2 of Fig. $1^\times$ of a round cask. Figs. $1^B$ and $1^C$ show enlarged sections of a single stave with different-shaped tongues and grooves. Figs. 9 and 10 on Sheets 4 and 3 show a side and end section, respectively, of a box barrel or package of a square character with rounded corners; and Fig. 11 on Sheet 4 shows an end view, to a small scale, of a box-barrel, showing the chining-hoops Y″ necessary for turning this form of barrel in the machine. Fig. 12 is an enlarged sectional view of the machine in elevation, showing the end frame A′ from the line 2 2, Fig. $1^\times$. Fig. 13 is a view of a modification of the chining and crozing implement.

Referring to the drawings, after the staves Z Z′ are built up and the truss-hoops Y Y′ temporarily put on in any usual manner the barrel or package so far formed either with the said tongue-and-grooved staves or with plain-jointed staves is placed and treated, as hereinafter described, in the improved construction of trussing, crozing, and finishing machine shown in these drawings.

The movable end frame A′ or frames A A′ of this improved trussing-machine are formed of a strong annular shape, with broad basement-soles $A^2$, and the outer end one A′ is traversed by its slide-base $A^2$ along on the planed bed B of the bed-plate B′ to truss up the barrel or package Z Z′ by means of two horizontal screw-spindles C C′, working in screw-nuts $A^4$, secured on the end frame A′. These screw-spindles C C′ are carried in journal-bearings at C″ opposite each other in the end frame A and fixed-gearing standard-frame D and are rotated by spur-gearing $c\ c'$ $c^2$, mounted on them at one end of the machine, so as to traverse the end trussing-frame A' (or it might be both frames A A') on the planed slide-bed B of the bed-frame B', secured to a suitable strong foundation to carry the whole machine. The spur-gearing $c\ c'\ c^2$ consists of a spur-wheel $c\ c'$, mounted at the end of each screw-spindle C C', both in gear with an intermediate spur-wheel $c^2$, mounted loosely by its hollow eye-spindle $c^3$ in a bearing-eye $D^2$ in the end standard D, supporting the gearing on the hollow shaft F. The lower screw-spindle C has its outer end carried in a bush-bearing at C'' in the end standard D', carrying the gearing and bolted by broad basement-flanges $D^3$, the same as the standard D, to the bed-plate B', and receives motion from reversing-pulleys I I' and open and cross bands $I^2\ I''$, with a slack pulley $I'''$ between them, actuated from a rotating first-motion or counter shaft, (not shown in the drawings,) the belt being shifted by a fork sliding-bar motion (shown at $I^3$ at the back of the pulleys I I' in brackets $I^4$) to give the reverse motions to the screw-spindles C C', as indicated by the arrows on the driving-bands, Figs. 1 and 2, Sheet 1; but they might be actuated by a shifting-clutch mounted on the shaft C between the pulleys I I' instead of the slack pulley $I'''$. Motion would be transmitted from the lower wheel $c$, through the intermediate loose spur-wheel $c^2$, to the other wheel $c'$ on the spindle C', so that both spur-wheels would act to rotate the screw-spindles C C' in either direction to traverse the end frame A' to or from the barrel or package Z being trussed to truss up the rings Y, Y', or Y'' and staves Z or relieve the barrel afterward for being chined and removed. These end trussing-frames A A' have four radial slide-blocks $a$, fitted on slide-guides $A^3$, on them, actuated by hand-screws $a'$ at their outer ends, while their inner ends $a^x$, which tighten up the end hoops Y Y, have also laterally-projecting screws or studs $a^2$ mounted on them, preferably so as to oscillate on stop bosses or hinges $a''$ to retain them in their lateral position, so as to carry pressing dogs or blocks $a^3$, with jam-nuts for retaining these dogs $a^3$ in position to take onto and press up the inner trussing-hoops Y' Y'. One of these swiveling spindles and dogs $a^2\ a^3$ in front on each trussing end frame A A' is made so as to hinge outward on its boss $a''$ and be locked or unlocked by the locker $h$ in its lateral acting position, so as to take out finished casks and insert new ones ready for being trussed and chined, as seen particularly in the enlarged views, Figs. 5 and 6.

A movable face-plate is or may be mounted at $a^4$ on the slides $a$ or on the frames A A' at each front inner end of the trussing-machine to bring the ends of the staves Z of the barrel or package to an even and proper level before trussing them, as dotted in in Figs. 5, 6, and 9.

When round or oval box barrels or packages are to be trussed, chined, and finished in the trussing and crozing machine, they are by one arrangement rotated by a central hollow shaft F, having mounted on it a boss F'', Figs. $1^x$ and 4, with movable toothed rack radial arms $ff$ at right angles to each other, actuated and adjusted by a central spur-wheel $F^2$ within the boss F''', secured on the inner end of a light shaft $F^3$, passing out through the hollow driving-shaft F, carried and driven in the double stock-head frame D D', secured to the bed-slide frame B' at one end of the machine and actuated by the belt-pulley $g$, mounted on it by a groove and feather and carried by a hollow eye-spindle F', working in a bearing $D^2$ in the top of the standard D' and driven by an open belt $g'$ at a slow speed from a pulley $g''$ on a counter-shaft $g^2$, carried in standards S close to the back of the bed-frame B B' $B^2$ and actuated by a pulley and belts at $g^x$ from the main or an intermediate counter-shaft, which actuates the belts $I^2\ I''$, but not shown in the drawings. The hollow shaft F may be held in any desired longitudinal position to which it is set by a pinching-screw through the hollow driving-boss F' or by a swiveling gab $F^4$, mounted on the lateral stud $F^5$, secured in the end frame D' and taking into grooves in the hollow spindle F. The spur-wheel $F^2$ when turned in one direction moves the racks $f$ outward, so as to cause their circumferential ends $f'$ to grip the inner surface of the barrel or box-barrel Z or Z', which would thus be rotated as the central hollow shaft F rotates. The spindle $F^3$ of the spur-wheel $F^2$ is carried out through the hollow driving-spindle F, actuating the said boss F''', and turned by a screw-wheel $f^3$ and hand-screw spindle $f^4$, carried on the end of the outer hollow shaft F'. A first-motion high-speed shaft G is mounted, preferably, in journal-bearings G', formed on the transverse webs of the lower part $B^2$ of the sole-plate or frame-bed B B', and which might be all covered in, except where the two belt-pulleys $G^2$ are mounted on the shafts G for the belts G'' to pass up and actuate the pulleys E'' on the end spindles E, which carry the saws $e'$ and cutters $e^2\ e''$ for chining the cask, as will be hereinafter described. This shaft G is driven at a high speed by the fast and loose small pulleys $g^3\ g'''$, mounted on its overhung end and actuated by a belt $g^4$ from a large pulley on the first-motion counter-shaft (not shown in the drawings) and shifted by the hand fork-lever $g^5$, mounted on a bracket $g^6$ at the lower part of the end frame D'.

A further improvement consists in mounting a light oscillating frame $E^2$ by bush-bearings $E^3$ at its lower ends on each side of the pulleys $G^2$ on the driving-shaft G, carried in the bed-plate B' $B^2$ or other equivalent oscillating center, which might be over the machine instead of under it outside each of the two end trussing-frames A A', and carrying in bearings E' E' on their upper ends the two short horizontal rotating spindles E, with bosses $e$ on their projecting ends and with the saws $e'$ and cutters $e^2$ $e''$ for projecting within the open ends of the barrel or box-barrel Z or Z', as shown to a large scale in Figs. 7 and 8, so as to cut the ends of these or the staves to the proper length and chine and groove them at $z^2$ or check them within, as at $z^3$, to receive the closing ends, the frames $E^2$ and their spindles E, rocking to the shape and rounded corners of the cask or case, while the saws $e'$ cut the ends of the cask to their exact length and while the cutters $e^2$ $e''$ are dressing and chining it, cutting in the opposite direction to the slowly-rotating barrel-case, actuated as before described and as indicated by the arrows. A rotating disk-collar or guide-guard $e^3$ is mounted on the boss $e$ on the inner end of the swinging saw-spindles E, all secured by a nut $e^4$. The disks $e^3$ are made of such a size as to allow the saw to cut through the staves and the knives to cut in and chine and croze the cask until the disk $e^3$ rolls on the full wood of the staves beyond the chine and groove on the inside and so regulates and adjusts the depth of the chine and wood cut away and prevents the frame and spindle from coming radially forward any farther, however hard the person may pull it. Each of these rotating cutting-spindles E is driven by a small pulley $E''$, mounted on the center of its spindle E between its bearings $E'$ in the frame $E^2$, and a driving-band $G''$, passed over another pulley $G^2$ on the lower shaft G within the bed-frame B B' and moved longitudinally along with its oscillating frame $E^2$ on this shaft by a hand-screw spindle $E^4$ or other equivalent fitted on the oscillating frame $E^2$, passed through a screw-bush at $E^5$, oscillating in a segmental slot $E^6$ in each of the trussing-frames A A', as seen more particularly in Figs. $1^\times$ and 4. These oscillating frames $E^2$, carrying the saw and cutter spindles E, are mounted with a bow-handle at J in front to throw their cutter-spindles E into or out of action against the power of a counter-weight and cord J', attached to and mounted at their back over guide-pulleys $J^2$, carried to slide on studs $J''$ and so as to draw the spindles and cutters into action with any desired degree of tension against the power of the weight and cord J', which takes them out of action.

When desired, both the casks and packages Z or Z' may be rotated within the trussing-machine by passing an endless belt around their outer surface or around a hoop temporarily secured on them and driving same by a band $j$ (indicated by dotted lines in Figs. $1^\times$, $2^\times$, and 4 on Sheets 2 and 4) from a pulley $j'$ on the before-mentioned counter-shaft $g^2$, the band $j$ being tightened up by a movable tightening-pulley $j''$, carried on a lever $j^2$, oscillating loosely on the shaft $g^2$ and actuated by a counterweighted treadle-lever and rod $j^3$ $j'''$, fulcrumed on a spindle $j^4$, as seen more particularly in Fig. 4, the barrel Z rotating while the foot is on the treadle $j^3$ only.

Fig. 12 on Sheet 5 shows to a large scale a sectional end view, as taken on the line 2 2 in Fig. $1^\times$, of the end frame A', which screws up the temporary hoops Y,Y', or Y'' and in which the barrel or package Z or Z' is turned on the screwed-up hoops Y Y on the inner end $a^\times$ of the slides $a$, and showing an arrangement of lever mechanism L for throwing the back dogs $a^3$ out of action after tightening up the temporary hoops Y Y' Y'' for the turning of the casks; and Fig. 13 shows a plan view of the chining and crozing spindle E and its frame E' $E^2$, corresponding to these parts in Fig. 12, and showing a different arrangement for guiding the cutter-head and cutters $e^2$ $e''$ from that shown in Figs. $1^\times$ to 4 and 7 and 8 for chining and crozing the inner ends of the casks.

Referring to Fig. 12, the improved mechanism for throwing the back dogs $a^3$ $a^3$ out of action consists of a hand-lever L, fulcrumed on the back stud $J''$ or other stud close to each frame A A' and having the handle of the lever L projecting out in front through a retaining checked slide-bracket L', bolted to the front flange of each frame A A'. This lever L is connected to the tilting spindle $a^2$ of the lower back dogs $a^3$ by a slot at $L''$ and by a chain $L^2$, connected by an eye at its upper end to the tilting spindle $a^2$ of the upper dogs $a^3$, the chain being passed over a guide-pulley $L^3$, carried on a stud $L^4$, projecting from each frame A A', all so that when the handle of the lever L is secured in the upper position of its slotted retaining-guide L' (seen in Fig. 4) the back dogs $a^3$ in the end frames A A' will be in position for tightening up the inner chining-hoops Y' Y', but when the lever L is lowered to the position seen in dotted lines in Fig. 12 after chining up the hoops it will tilt the dogs $a^3$ $a^3$ out of action, when the barrel will be then turned on its outer hoop Y Y on the inner ends $a^\times$ to cut off the ends of the staves and chine and croze them by the cutters $e^2$ $e''$ on the spindles E E in the rocking frame $E^2$, all as hereinbefore described; but by another improvement (shown in Figs. 12 and 13) in some cases it is preferred when the staves are not carefully jointed and even in the inside to guide the spindle and cutters by a fixed curved or segmental guide $e^5$, carried by a bracket $e^6$, bolted at $e^7$ to the upper end of the rocking frame $E^2$, instead of the rotating disk $e^3$, secured to the inner end of the spindle E, hereinbefore described. A shifting stop-bracket $e^8$ is secured to the outside of the frames A A' by a slot and screw at $e^9$ for stopping the oscillating frame $E^2$ when the cutters have cut the chine of the barrel to the proper diameter, this bracket $e^8$ shifting to suit for barrels of different sizes.

What I claim is—

In a machine for trussing, crozing, and finishing barrels, the combination of a central hollow shaft F, on which is mounted a boss with radially-movable segment-carrying rack-arms, with a shaft $F^3$ passing out through the said hollow driving-shaft F, mounted in a double stock-head frame D D' and provided with a spur-wheel $F^2$ to actuate and adjust the said arms, and gearing for rotating the barrel, substantially as set forth.

In testimony whereof I have signed my name to this specification in the presence of two subscribing witnesses.

SAMUEL WRIGHT.

Witnesses:
JOHN SIME,
R. C. THOMSON.